No. 750,756. PATENTED JAN. 26, 1904.
I. I. EKLUND.
CHEESE HOLDER.
APPLICATION FILED JULY 2, 1903.
NO MODEL.
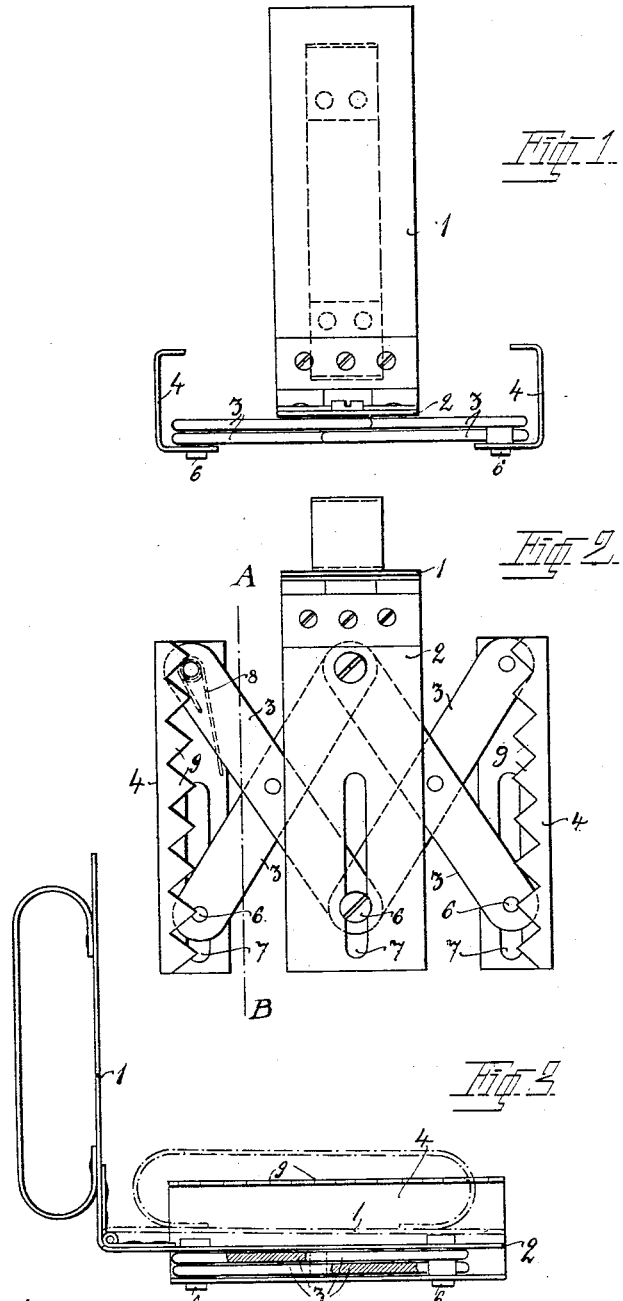
Attest
E. P. Barges
Geo. M. Copenhaver.
Inventor
Isak I. Eklund
by William F. Hall
his atty.

No. 750,756. Patented January 26, 1904.

UNITED STATES PATENT OFFICE.

ISAK ISRAELSSON EKLUND, OF STOCKHOLM, SWEDEN.

CHEESE-HOLDER.

SPECIFICATION forming part of Letters Patent No. 750,756, dated January 26, 1904.

Application filed July 2, 1903. Serial No. 163,994. (No model.)

*To all whom it may concern:*

Be it known that I, ISAK ISRAELSSON EKLUND, manufacturer, a subject of the Grand Duke of Finland, residing at 48 Karlavägen, Stockholm, in the Kingdom of Sweden, have invented certain new and useful Improvements in Cheese-Holders, of which the following is a specification, reference being had therein to the accompanying drawings.

The present invention relates to a cheese-holder in which a piece of cheese of suitable size can be placed and held, which cheese-holder can be held in the hand when cutting cheese, so that it is not necessary, as has hitherto usually been the case, to take hold of the cheese itself.

A cheese-holder made in accordance with this invention is shown in the accompanying drawings, in Figure 1 in front elevation, in Fig. 2 in plan, and in Fig. 3 in section along the line A B in Fig. 2.

The cheese-holder consists of two plates 1 and 2, which are in any convenient way hinged together and of which the one (the plate 2) is connected in some suitable manner to an adjustable device, generally called "Nuremberg shears," formed by a suitable number of links 3 and at each end provided with a jaw 4, between which jaws 4 the piece of cheese is placed, resting on the plate 2 and abutting against the turned-up plate 1. The hinge joining the plates 1 and 2 is preferably so arranged as the plate 1 when it is opened is prevented from passing beyond a certain desired position.

When a piece of cheese is to be placed in the holder, the jaws 4 are moved to such a distance from each other that the piece can be placed between them. In order to allow for the necessary movement of the links 3 when opening and closing the jaws, the links are at one end provided with pins 6, which enter the groove 7 in the jaws and in the plate 2 and which are provided with heads, by means of which the said pins are kept in the grooves. The other ends of the links are pivotally connected to the jaws and to the plate 2. The jaws can of themselves close together against the piece of cheese placed between them in consequence of a spring 8, which is mounted at a suitable place—for instance, between one of the jaws and the link pivotally connected to the same—the one end of the said spring being attached to the jaw and the other end to the link, thereby constantly holding the jaws against the piece of cheese. In order that the jaws may, besides, have a sure hold of the piece, they are provided with teeth 9. These teeth may, however, if given some suitable form be sufficient for holding the cheese without the aid of the spring 8, wherefore the said spring may be omitted, if desired. When cutting cheese, the plate 1 constitutes a support for the thumb, in consequence of which it is unnecessary to touch the cheese with the fingers. Besides, this plate also constitutes a guard in the event of the knife slipping and also a handle when taking up or putting down the cheese.

If desired, the plate 1 may on the outside be provided with a handle of some suitable form.

When the cheese-holder is not in use, the plate 1 is closed down in the position shown in Fig. 3 by dotted lines and the jaws 4 are closed up against the plates. Considering that the principal parts of the cheese-holder consist of the jaws, which are movable to and from each other, it is obvious that the plates 1 and 2, if desired, may be omitted. It is likewise obvious that instead of the links 3 some other suitable contrivance may be employed which permits the jaws to approach and move away from each other.

Having now described my invention, what I claim as new, and desire to secure by Letters Patent, is—

1. In a cheese-holder and in combination, a central supporting-plate, jaws disposed on each longitudinal side thereof, means for adjustably supporting the jaws from said plate, and a second plate secured to one transverse end of the first plate, substantially as described.

2. In a cheese-holder and in combination, a central supporting-plate, jaws disposed on each longitudinal side thereof, means for adjustably supporting the jaws from said plate, and a second plate pivotally secured to one transverse end of the first plate, substantially as described.

3. In a cheese-holder and in combination, a central supporting-plate, jaws disposed on each longitudinal side thereof, means for adjustably supporting the jaws from said plate, and a second plate pivotally secured to one transverse end of the first plate having a limited pivotal movement, substantially as described.

4. In a cheese-holder and in combination, a central supporting-plate, jaws disposed on each longitudinal side thereof, means for adjustably supporting the jaws from said plate, and means for normally forcing the jaws toward each other, substantially as described.

5. In a cheese-holder and in combination, a central supporting-plate, jaws disposed on each longitudinal side thereof, means for adjustably supporting the jaws from said plate, and a spring for normally forcing the jaws toward each other, substantially as described.

6. In a cheese-holder and in combination, a central supporting-plate, jaws disposed on each longitudinal side thereof having flanged upper and lower longitudinal edges, said upper flanges being serrated and the lower flanges being provided with longitudinally-extending slots, and Nuremberg shears connecting the jaws to said plate, the outer ends of one set of links of said shears coacting with said slots in the lower flanges of said jaws, substantially as described.

7. In a cheese-holder and in combination, a central supporting-plate, jaws disposed on each longitudinal side thereof, Nuremberg shears adjustably connecting the jaws to said plate, and a spring coacting with one of said jaws and one of the links of said shears for normally forcing the jaws toward each other, substantially as described.

In witness whereof I have hereunto set my hand in presence of two witnesses.

ISAK ISRAELSSON EKLUND.

Witnesses:
CARL TH. SUNDHOLM,
HANS B. OHLSSON.